US012621417B1

(12) United States Patent
Jaiswal et al.

(10) Patent No.: US 12,621,417 B1
(45) Date of Patent: May 5, 2026

(54) FACE-AWARE RELIGHTING OF LIVE VIDEO CONTENT

(71) Applicant: Amazon Technologies, Inc., Seattle, WA (US)

(72) Inventors: Prerit Jaiswal, Fremont, CA (US); Mehmet Umut Isik, White Plains, NY (US); Srikanth Venkata Tenneti, Menlo Park, CA (US); Samuel J Wilson, Encinitas, CA (US); Amritpal Singh Saini, Brampton (CA); Parisa Rahimzadeh, Campbell, CA (US); Amalavoyal Chari, Los Altos, CA (US); Michael Mark Goodwin, Scotts Valley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 485 days.

(21) Appl. No.: 18/129,741

(22) Filed: Mar. 31, 2023

(51) Int. Cl.
*G06T 5/00* (2024.01)
*G06T 5/50* (2006.01)
(Continued)

(52) U.S. Cl.
CPC ............... *H04N 9/643* (2013.01); *G06T 5/50* (2013.01); *G06T 7/11* (2017.01); *G06V 10/70* (2022.01);
(Continued)

(58) Field of Classification Search
CPC ........... H04N 7/15; H04N 1/62; H04N 5/262; H04N 7/147; G06T 2207/10016;
(Continued)

(56) References Cited

U.S. PATENT DOCUMENTS

| | | | |
|---|---|---|---|
| 11,412,133 B1 * | 8/2022 | Morton | ................ G05D 1/0246 |
| 2006/0088209 A1 * | 4/2006 | Yu | ........................... H04N 9/646 |
| | | | 382/167 |

(Continued)

OTHER PUBLICATIONS

Shi, Cuizhu, et al. "Automatic image quality improvement for videoconferencing." 2004 IEEE International Conference on Acoustics, Speech, and Signal Processing. vol. 3. IEEE, 2004.*

(Continued)

*Primary Examiner* — Li Liu
(74) *Attorney, Agent, or Firm* — Knobbe, Martens, Olson & Bear, LLP

(57) ABSTRACT

Systems and methods are provided for modifying video content to improve lighting of a person's face depicted within the video content. Pixels depicting skin may be detected in a first frame of the video content. Transformation parameters may then be determined based on intensity values of the pixels depicting skin, where the transformation parameters represent adjusted pixel intensity values determined to improve at least one of brightness or contrast of the pixels depicting skin. Based on the transformation parameters, intensity association data may be generated and stored that associates each possible input pixel intensity value in at least one channel with a corresponding adjusted pixel intensity value. The stored intensity association data as determined with respect to the first frame may then be reused to modify intensity values for a series of frames of the video content.

18 Claims, 5 Drawing Sheets

Original incoming video frame 102

Image of cropped face 104

Skin segmentation mask 106

(1) Detect face (2) Segment skin (3) Determine transformation parameters (4) Apply transformation parameters Relit video frame 110

(51) Int. Cl.

| | |
|---|---|
| *G06T 7/11* | (2017.01) |
| *G06V 10/70* | (2022.01) |
| *G06V 40/16* | (2022.01) |
| *H04N 9/64* | (2023.01) |

(52) U.S. Cl.
CPC .. *G06V 40/162* (2022.01); *G06T 2207/10016* (2013.01); *G06T 2207/10024* (2013.01); *G06T 2207/20084* (2013.01); *G06T 2207/20132* (2013.01); *G06T 2207/30201* (2013.01)

(58) Field of Classification Search
CPC .......... G06T 2207/10144; G06T 2207/20012; G06V 40/161; G06V 40/162
See application file for complete search history.

(56) References Cited

U.S. PATENT DOCUMENTS

| | | | | |
|---|---|---|---|---|
| 2008/0279467 A1* | 11/2008 | Liu | ...................... | G06V 40/162 382/254 |
| 2011/0298886 A1* | 12/2011 | Price | ...................... | H04N 23/71 348/E5.037 |
| 2012/0242904 A1* | 9/2012 | Shirai | .................. | G09G 3/3426 348/673 |
| 2014/0085398 A1* | 3/2014 | Tian | ......................... | H04N 7/15 348/14.01 |
| 2024/0007582 A1* | 1/2024 | Kwong | .................. | H04N 5/262 |

OTHER PUBLICATIONS

Mangiat, Stephen, and Jerry Gibson. "Automatic scene relighting for video conferencing." 2009 16th IEEE International Conference on Image Processing (ICIP). IEEE, 2009.*

Sun, Mingxuan, et al. "Active lighting for video conferencing." IEEE transactions on circuits and systems for video technology 19.12 (2009): 1819-1829.*

Guo et al., "Real-time Face View Correction for Front-facing Cameras", Computational Visual Media, vol. 7, No. 4, Dec. 2021, 437-452, in 16 pages.

Li et al., "FaceSeg: Automatic Face Segmentation for Real-time Video", IEEE Transactions on Multimedia, 2009 in 12 pages.

Reuters, New York Post: "Video Chat Apps Making Tweaks to Illuminate Darker Skin Tones", dated Jun. 7, 2021 in 5 pages.

Yun-Ta Tsai, Google Research, "Portrait Light: Enhancing Portrait Lighting with Machine Learning", Dec. 11, 2020 in 9 pages.

* cited by examiner

FACE-AWARE RELIGHTING OF LIVE VIDEO CONTENT

BACKGROUND

Videoconferencing software enables people to communicate in real time via video and audio over the Internet, relying in part on cameras and microphones that may be integrated within or in local communication with participants' computers or smartphones. When a videoconference call is initiated, local and/or remotely executed software may operate to establish a connection (which may be indirect) between the participants' devices and stream video and audio data back and forth, typically via a server or network-accessible videoconferencing service. While existing video-conferencing software enables remote communication and collaboration between people using any of a variety of hardware, including commonly owned devices such as a laptop computer with integrated camera, participants' faces are not always well lit or even clearly visible in the streaming video content. For example, a video conferencing participant's face may not be sufficiently viewable by other participants during a videoconference for reasons that may include poor lighting in the user's physical environment, improper placement of lighting (e.g., light sources behind a user's face rather than in front of it), improper camera settings, and/or low camera quality.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

Figure 1:
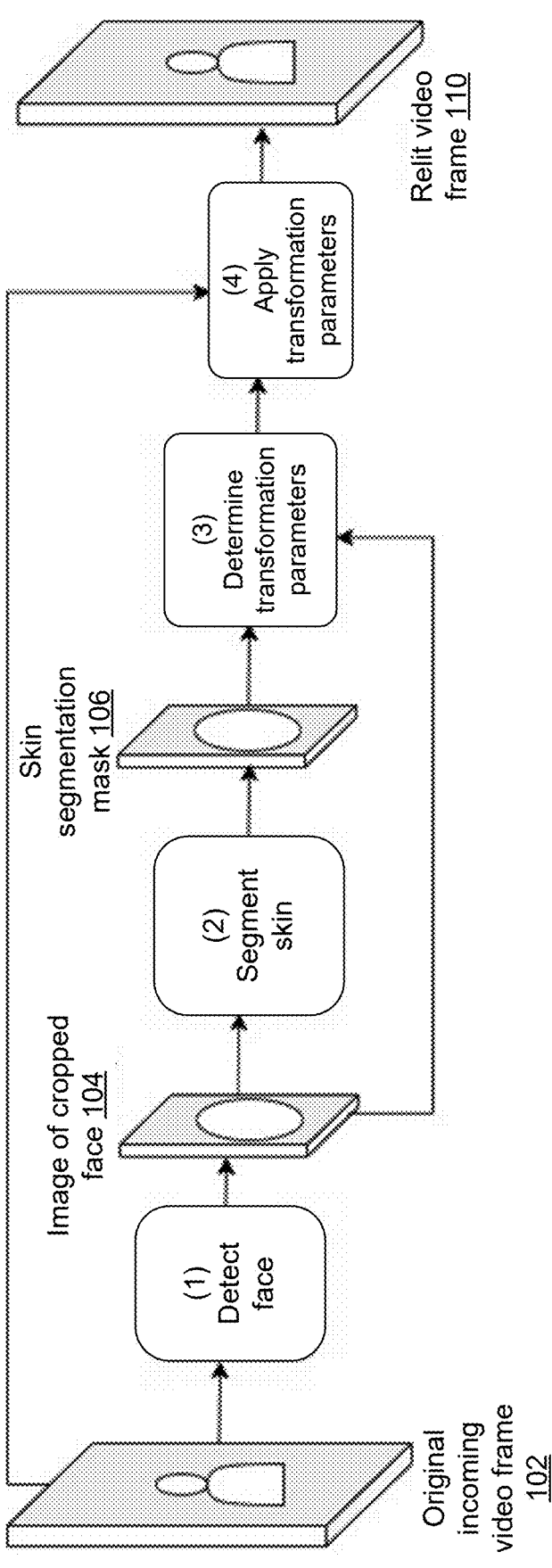
FIG. 1 is a block diagram depicting high level steps and data flow for adjusting video frames of an incoming video stream to improve the apparent lighting of a person's face appearing therein, according to some embodiments.

Generally described, aspects of the present disclosure relate to machine learning-based approaches for modifying captured video content to improve lighting of a subject, specifically the visibility, brightness and/or contrast of human faces within video content. Relighting approaches disclosed herein can be performed in a computationally efficient manner that can be implemented in real time or substantially real time as video is captured by a camera on consumer-grade devices, such as laptop computers or mobile devices. While improved video lighting adjustments will often be discussed herein in association with improving lighting of a participant's face during video calling or video conferences, these features may alternatively be used to improve lighting of a face or other object of interest in other contexts of video capture or processing, such as live video streaming, broadcasting, or storing captured video locally on a user's device.

In some embodiments, face relighting features performed with respect to video content described herein may include (i) face detection to detect one or more faces, such as using a machine learning model, in an initial frame of the video content, (ii) skin segmentation, such as using a machine learning model, to identify pixels in the face region that depict skin, and then (iii) histogram adjustment that adjusts the colors of the input frame so that the face appears better lit, such as having improved brightness and/or contrast. For efficiency purposes, steps (i) and (ii) do not need to be executed with respect to every frame, as they are computationally more complex than step (iii), which can be performed efficiently every frame using a lookup table or other data structure, as will be described in more detail herein. As will be further described below, steps (i) and (ii) may only be repeated for subsequent frames in response to trigger events, such as a certain time duration passing (e.g., determining new transformation parameters every three seconds) or a detected lighting change in the video content (e.g., a comparison of brightness in the new frame relative to a previous frame suggests that that a light source moved or changed in the real world scene, or a person in the frame moved positions relative to real world light sources in their environment).

Thus, according to some embodiments, pixels depicting skin may be detected in a first frame of input video content, such as video content received locally as it is captured by a camera. Transformation parameters may then be determined based on intensity values of the pixels depicting skin, where the transformation parameters represent adjusted pixel intensity values determined to improve at least one of brightness or contrast of the pixels depicting skin. Based on the transformation parameters, intensity association data, such as in the form of a lookup table, may be generated and stored that associates each possible input pixel intensity value in at least one channel (e.g., the V, or value, channel in the HSV ("Hue, Saturation, Value") color space) with a corresponding adjusted pixel intensity value. This stored intensity association data as determined with respect to the first frame may be used to modify intensity values for a series of frames of the video content, without applying skin segmentation to each subsequent frame in the series or recreating the lookup table until a trigger event occurs, as will be further discussed below.

As mentioned above, video relighting approaches disclosed herein can be performed in a computationally efficient manner that can be implemented in real time as video is captured by a camera on consumer-grade devices, such as laptop computers or mobile devices. Technical problems addressed by aspects of the present disclosure, particularly in embodiments designed to operate on client devices with relatively limiting processing power, include the challenge of improving lighting of a person's face in video without executing computationally demanding steps (particularly with respect to every frame of the video) that tend to be performed in previous approaches to video lighting improvement. For example, limitations of various prior art approaches to relighting that consider a face specifically include that many such approaches perform face detection features (such as using computationally intensive machine learning models) every frame, perform computationally intensive lighting adjustments (such as applying an artificial directional light source), and/or require image composition steps for each frame (such as applying lighting adjustments to a face or other subset of a frame that is then merged back into the remainder of the original frame). Some of the computationally intensive steps performed according to existing face relighting techniques are avoided according to embodiments described herein (for example, replacement pixel values determined from an efficient lookup table may be applied consistently across all pixels of a frame, without checking for face location in the particular frame), and others may be performed much less frequently (such as every few seconds as opposed to every frame). These and other technical improvements enable face-aware video relighting to be performed on devices with relatively limited processing power, such as mobile phones, that would be unable to perform many prior art relighting techniques, at least in real time or near-real time.

FIG. 1 is a block diagram depicting high level steps and data flow for adjusting video frames of an incoming video stream to improve the apparent lighting of a person's face appearing therein, according to some embodiments. The steps (1) through (4) depicted in FIG. 1 may be performed, in some embodiments, by one or more computing systems that include video relighting components 210, which will be further described with respect to other figures below. FIG. 1 illustrates a process that may be performed to adjust lighting with respect to an individual frame of video content. A more computationally efficient, modified process may be utilized for relighting a series of subsequent frames in the video content, as will be described with respect to other figures below.

According to the embodiment shown in FIG. 1, at step (1) the computing system, which may be a videoconference participant's computer that is locally preparing video content for upload or streaming to other devices, detects a human face depicted in an original incoming video frame 102. The video frame 102, in some embodiments, may be a first video frame that is received by the video relighting components 210, described below, substantially in real time as video begins to be captured by a local or remote camera, such as during a live video stream or videoconferencing session. A face detection module or component implemented by the computing system may utilize a machine learning model to detect one or more faces depicted in the video frame 102, such as by determining coordinates of a bounding box that contains a face depicted in image data within the bounding box. It will be appreciated that there are a number of known types of machine learning models suitable for detecting human faces when trained on labelled training images of faces. For example, the face detection at step (1) may be implemented in part using a convolutional neural network that outputs pixel coordinates defining one or more bounding regions within the video frame 102. From the bounding region information, the computing system in the illustrated embodiment generates a cropped image 104, where the cropped image includes the pixel data within the bounding region that depicts the detected face.

At step (2) of the embodiment shown in FIG. 1, the computing system applies skin segmentation in order to identify the subset of pixels within the cropped face image 104 that depict human skin. For example, a machine learning model (such as a previously trained neural network) or other skin segmentation module may take as input an RGB (referencing the primary colors red, green and blue) image of a person's face 104 and predict a segmentation mask 106 corresponding to the skin shown in the image (e.g., a mask of the pixels that depict skin of the person's face, excluding pixels corresponding to background, the person's eyes, hair, etc.). In other embodiments, the system may be configured to predict a segmentation mask for other portions of the person depicted in the frame, such as eyes, hair, teeth, etc., which may each result in a separate mask for which adjusted pixel intensity values will be determined.

At step (3) of the embodiment shown in FIG. 1, a post-processing module takes as input pixels (such as RGB pixel data) of the person's skin (e.g., based on the skin segmentation mask 106 and pixel data from the cropped face image 104) and outputs a set of parameters that are expected by the system to improve lighting appearance of the skin pixels, as will be further discussed below. These parameters are then applied at step (4) to transform the original video frame 102 such that the face depicted therein appears to have improved overall lighting in the resulting relit video frame 110 relative to the original unaltered video frame 102. In the illustrated embodiment, the entire video frame 102 (all pixels) has the determined lighting transformations applied, not just the skin pixels for which the parameters were initially determined. In some embodiments, RGB values of the video frame 102 may first be converted to the HSV color space. The V (value) channel of the HSV color space may thus be used by the system as a proxy for illumination, as will be further described herein. In other embodiments, other color spaces such as YUV, LAB, YCrCb, LUV, etc. may be employed rather than HSV. As will be further described herein, the transformation parameters determined at step (3) may be stored, such as in the form of a lookup table, in order to be reused with respect to relighting the next frame of the video.

Figure 2:
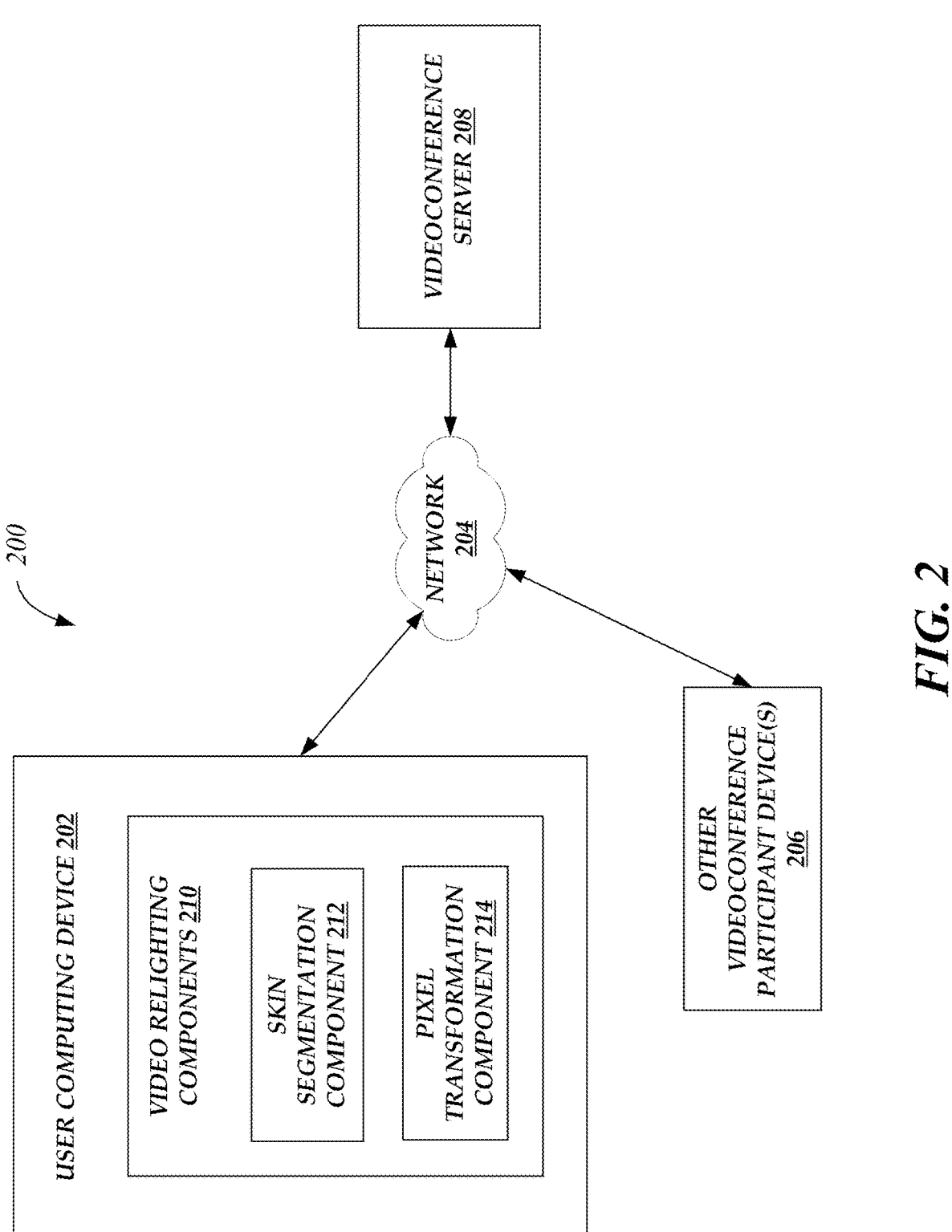
FIG. 2 depicts an illustrative operating environment for implementing aspects of the present disclosure, according to some embodiments.

FIG. 2 depicts an illustrative operating environment 200 for implementing aspects of the present disclosure, according to some embodiments. FIG. 2 is shown and described with reference to use of the video relighting components 210 in a videoconferencing context, though the present disclosure is not limited to such use cases, as will be further described below.

The illustrative operating environment 200 includes a user computing device 202, a videoconference server 208, and one or more other videoconference participant devices 206, all of which may be in communication over a network 204, such as the Internet. In some embodiments, the videoconference server 208 may provide videoconferencing services such as those known in the art (e.g., receiving streaming video and audio from participant devices, generating combined videoconference output, and sending the video in real time to other participants), such as the WebRTC (Web Real-Time Communication) conferencing protocol, without necessarily requiring modification on the server side for the relighting features described herein (which, in the illustrated embodiment of FIG. 2, may be implemented entirely on the user computing device 202). In other embodiments, the video relighting components 210 may be implemented on the server side, such as by or within videoconference server 208.

As shown, video relighting components 210 may be implemented by at least user computing device 202. The video relighting components 210 include a skin segmentation component 212 and pixel transformation component 214, which may perform respective functionality as described above with respect to FIG. 1 and below with respect to FIG. 3. In some embodiments, the video relighting components may be provided by an operator of the videoconference server 208 or other entity in the form of a software development kit (SDK) that allows relighting functionality to be integrated within a video capture application or videoconferencing application installed on the user computing device 202. As other examples, the video relighting components 210 may be implemented within a dedicated application, or as browser-delivered and executed code to support videoconferencing services presented within a standard browser application. It will be appreciated that one or more of the other participant devices 206 may also execute their own instances of the video relighting components 210 in order to enhance lighting of video captured on the respective one of participant devices 206 prior to upload of the modified video frames to videoconference server 208 for real time sharing with other participant devices (including user computing device 202) over the network 204.

In some embodiments, the relighting services provided by video relighting components 210 may be initiated via one or more function calls that an application executing on the user computing device 202 (such as a videoconferencing application) initiates in order to improve lighting on video content in real time or near real time as the content is captured by a camera, prior to upload to the videoconference server 208 for real time distribution to other videoconference participant device(s) 206 that are being utilized by other people participating in a videoconference with the user of user computing device 202. For example, user computing device 202 may be a laptop computer, desktop computer, mobile phone, or tablet device (among other device types) with an integrated or connected video camera that is capturing real time video of the face of the user of device 202. The video relighting components 210 may modify the pixel intensities of each of the individual frames of the captured video content in real time while the video capture continues, and the user computing device may send the frames as soon as they are relit by the pixel transformation component 214 to the videoconference server 208 as a continuous video stream.

Accordingly, the video relighting components 210 may not introduce any human-perceptible delay in the streaming of the video content originating from user computing device 202, but may result in substantially improved lighting appearance (such as improved brightness and/or contrast that better approximates what typical viewers would consider ideal lighting conditions) than if the unaltered video as originally captured by the camera were presented to other participants in the videoconference.

While FIG. 2 has been shown and described with reference to use of the video relighting components 210 in a videoconferencing context, in other embodiments, the video relighting components 210 may operate on user computing device 202 or on a server (or other system remote from a user's device) outside of a videoconferencing context. In some such embodiments, the user computing device 202 may not be in communication with other systems or devices over a network when implementing video relighting features described herein. For example, the user computing device 202 may implement the video relighting components 210 with respect to previously stored video content that is locally accessible to the user computing device 202 (e.g., to improve the lighting of a face in previously captured video stored on a user's mobile phone or tablet computer), or in connection with live video streaming in a context other than videoconferencing (e.g., in connection with a live event being broadcast on a video sharing service, social networking service, and/or other live streaming service).

Figure 3:
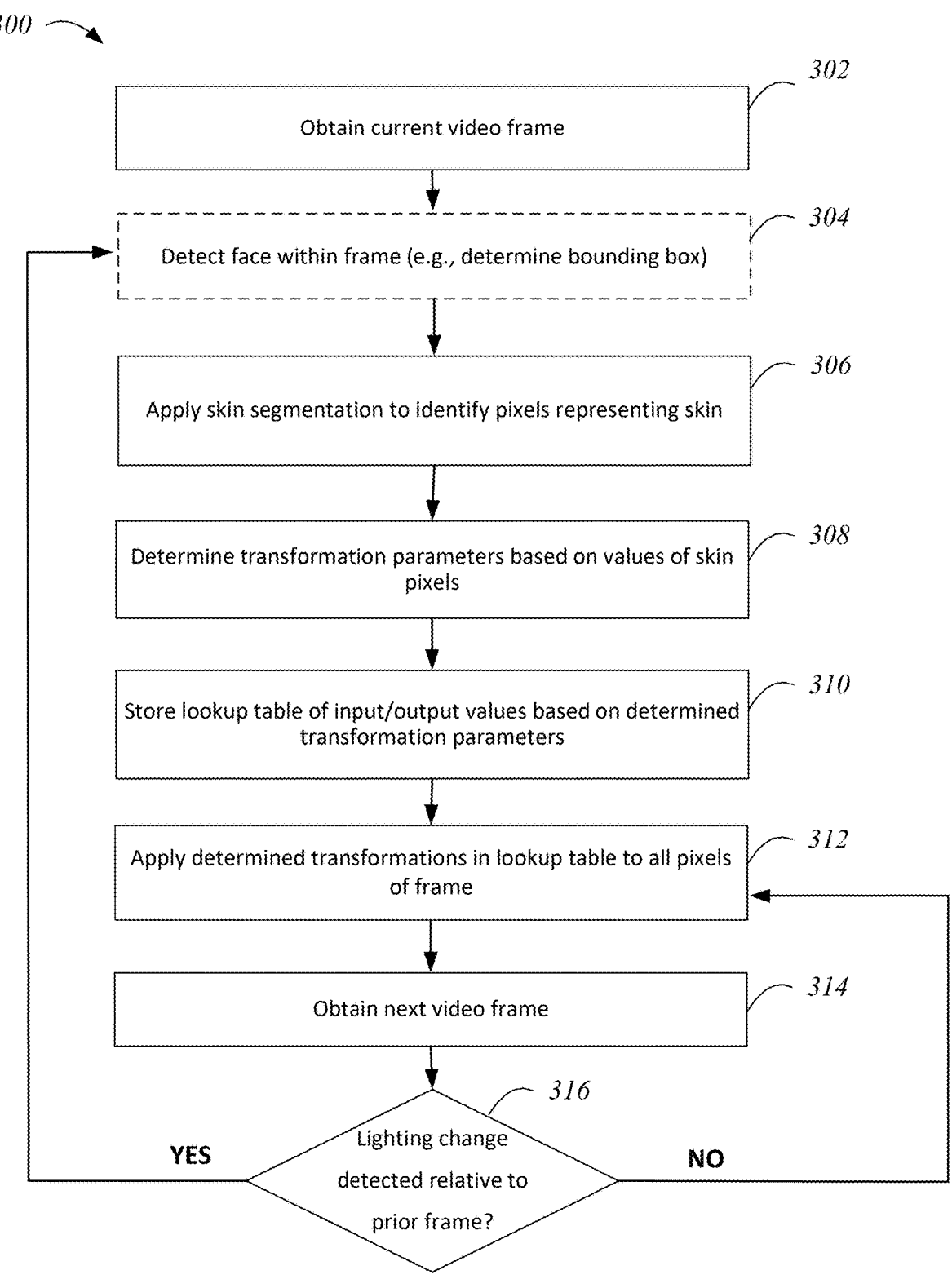
FIG. 3 is a flow diagram of an illustrative method for transforming pixel values within video frames to improve the lighting of a person's face appearing within the video content, according to some embodiments.

FIG. 3 is a flow diagram of an illustrative method 300 for transforming pixel values within video frames to improve the lighting of a person's face appearing within the video content, according to some embodiments. The illustrative method 300 may be performed, for example, by the user computing device 202 when executing or implementing the video relighting components 210. In other embodiments, as discussed above, the videoconference server 208 or other system remote to a video capture device may implement the method 300. For ease of description and to not limit the method of FIG. 3 to embodiments implemented on a user computing device, the method 300 will be described below as being performed by a computing system that includes video relighting components 210.

The illustrative method 300 begins at block 302, where the computing system obtains the current video frame, such as a most recent frame received by the video relighting components 210 after the frame has been captured by a camera. Next, at block 304, the computing system may detect a human face depicted within the current frame. For example, as discussed above, a machine learning model may predict or determine coordinates defining a bounding region (e.g., as a rectangle) that includes a detected human face depicted as pixel data within the bounding region.

In some embodiments, a machine learning model (such as a convolutional neural network, as one example) utilized for face detection at block 304 may have been previously trained to detect human faces using training images or videos that included humans having a wide variety of face types, face shapes, skin tones, ethnicities, ages, in different positions and poses, different lighting conditions, etc. As discussed above, the output at block 304 may be a cropped image that is generated by the computing system, where the cropped image includes only the pixels within the determined bounding region for providing as input to block 306 for skin segmentation. In other embodiments, face detection may not be performed, and block 304 may be optional. For example, in some embodiments, the full video frame of block 302 may be provided as input to the skin segmentation block 306 described below, rather than only a portion of the image that includes a detected face.

At block 306, the computing system applies skin segmentation techniques to identify pixels representing skin within the face's bounding box (in embodiments in which block 304 was performed) or within the frame as a whole (in embodiments that do not implement a face detection step such as block 304). In some embodiments, skin pixels may be identified and/or segmented using a neural network or other machine learning model. For example, a neural network may be trained to identify pixels representing or depicting human facial skin based on labeled training images or videos that included humans having a wide variety of face types, face shapes, skin tones, ethnicities, ages, in different positions and poses relative to the camera, different lighting conditions, etc. In embodiments in which the method 300 is implemented on a user computing device or edge device, the machine learning model types utilized at blocks 304 and 306 may be selected to be accurate while also not exceeding the computational resources available on the device, such as by utilizing a small, low-latency, and/or low-power model type.

At block 308, the computing system determines transformation parameters to be applied to the frame based on values of the skin pixels identified at block 306. As an example, skin illumination can generally be considered a normal distribution, represented below, where x represents the skin illumination:

$x \sim N(\mu, \sigma)$, where $\mu$ is the mean, and $\sigma$ is the variance.

A goal in determining the transformation parameters, in some embodiments, may be to shift the normal distribution of the skin illumination to that of an "ideal" lighting illumination, which may be represented below, where y represents optimal illumination, $\mu_0$ is the corresponding optimal mean, and $\sigma_0$ is the corresponding optimal variance:

$$y \sim N(\mu_0, \sigma_0).$$

This shift can be accomplished by applying a linear transformation. For example, considering the transformation y=ax+b, then it can be shown that $\mu_0 = a\mu + b$ and $\sigma_0 = a\sigma$. Accordingly, the transformation parameters in one example embodiment may be arrived at as:

$$a = \sigma_0/\sigma \text{ and } b = \mu_0 - a\mu.$$

In some embodiments, the system may convert the image (e.g., the cropped face image from the video frame, including segmented skin pixels) to the HSV color space, before then calculating the mean, $\mu$, and standard deviation, $\sigma$, of skin pixels of the V channel (where the V, or Value, channel in the HSV color space generally represents illumination or brightness). The system may then change the value within each of the color channels using the following transformation:

$$x = \sigma_0/\sigma(x - \bar{x}) + \mu_0/\mu\bar{x},$$

where $\mu_0$ and $\sigma_0$ are the target intensity distribution parameters. Estimates for these parameters may be automatically determined from analysis of sample statistics, analysis of sample adjusted images, and/or manually tuned to achieve visually more pleasing results. In experiments, applying the above transformation on each color channel as opposed to only the V channel of the HSV color space resulted in better quality relighting, but is not required to achieve improved lighting. Additionally, in some instances the illumination distribution of an image is skewed instead of normal. In such cases, a simplified approach to address this issue may be for the system to treat the distribution as two separate distributions: (1) normal distribution without the right half and (2) normal distribution without the left half, optionally including an intermediate region for continuity.

When determining the transformation values, the system may apply one or more clipping techniques in order to prevent transformation values from falling outside of the bounded range of 0 to 1, or 0 to 255, depending on the implementation and color space. While hard clipping may be applied to all values over or under the bounded cutoffs (e.g., under 0 or over 1), this may produce undesired artifacts in the output (relit) image. Accordingly, in some embodiments, both lower bound clipping and upper bound clipping may be implemented in a manner whereby values falling near the bounded cutoff values are more gradually adjusted (e.g., by modifying the response function for values falling near the lower and upper bounds).

At block 310, the computing system generates and stores a lookup table of input/output values based on the transformation parameters determined at block 308. This lookup table may indicate for any given original pixel intensity value that could be present in any input image in the given color space, a corresponding determined modified intensity value that should replace the original intensity value in the relit version of the frame. While a lookup table is one data structure that may be utilized for this type of quick mapping, it will be appreciated that other data structures may alternatively be used to associate pairings of input and output pixel intensity values. In some embodiments, a one-dimensional lookup table may be sufficient in order to adjust brightness and/or contrast. In other embodiments, a three-dimensional or other dimensional table could be used in order to support changes to color, tint, saturation, exposure, and/or other aspects of the video content.

In some embodiments, state parameters of the relighting process or algorithm may be represented as lookup table values corresponding to each possible input value for each color channel. For example, in embodiments in which the RGB color mode is used there may be a total of 768 parameters (256×3, given that there are three channels in RGB color mode that may each have 256 values). Taking the R color channel as an example, element number k of a 256 dimensional array may store the pixel value that should be the final output (resulting transformation value) wherever the input pixel value for a given pixel location equals k. In instances in which there have already been loops through the method 300 (such as returning to block 310 for a later frame after a lookup table has already been stored for an earlier frame in the same video content), the state parameters may be updated in the table using a moving average. For example, the new value for a given table entry may be a weighted sum of the previous parameter entry in that table position and the new parameter determined for the newly processed frame.

At block 312, the computing system applies the determined transformations in the lookup table to all pixels of the current frame. Accordingly, while the parameters were determined based on analysis of the lighting of skin pixels, the determined transformations may be applied to all pixels, not just those depicting skin (e.g., applied to background, such as a wall behind the person in the video, applied to clothing, eyes, hair, and other aspects of the real-world scene depicted in the frame). In embodiments in which the video content is being uploaded, streamed or otherwise provided to another system in real time as the video is captured (such as in videoconferencing embodiments), the system may send the relit frame over the network to a recipient (such as a videoconference server) after block 312 (not illustrated in FIG. 3).

At block 314, the computing system obtains the next video frame. For example, this may be a next frame received in real time or near real time as captured by a local camera as a user is live streaming or participating in a videoconference. The computing system may then, at decision block 316, determine whether there has been a significant lighting change detected relative to the prior frame, or whether some other trigger event for recalculating transformation parameters has occurred, depending on the embodiment.

To identify whether a significant lighting change as occurred, the system may calculate the mean intensity of the current frame, and then compare this mean intensity to the mean intensity of a prior frame (which may have been temporarily stored during processing of the prior frame). This change in lighting, such as may be determined based on the difference between the intensity of this current frame and the previous frame (or the frame in which lookup table values were last stored, in some embodiments) may enable the system to determine whether the real world lighting in the user's physical environment has substantially changed or the user has quickly moved within the frame in a manner that affects lighting of the user's face.

If the intensity change is less than a predetermined threshold, the system may determine not to update the state parameters or lookup table values unless some other trigger event has occurred. For example, the system may update the lookup table values even in the absence of a detected lighting change if sufficient time has passed, such as two seconds has elapsed since the lookup table values were last determined and stored. If the determination at block 316 is that no trigger event (e.g., based on significant lighting change detected and/or an elapsed time since the last update) has occurred, then the method proceeds to return to block 312 to apply the previously determined transformations from the lookup table to pixels of the now-current frame obtained at block 314. Otherwise, if the determination at block 316 is that a trigger event has occurred, the method proceeds to return to block 304 (in embodiments in which face detection occurs prior to skin segmentation) or to block 306 in order to begin the steps to determine new transformation parameters and lookup table values based on the now-current frame obtained at block 314. The method may continue to loop through the blocks as illustrated until there is no further video content to process (e.g., a videoconferencing session ends, or all frames of a stored video file have been relit).

Figure 4:
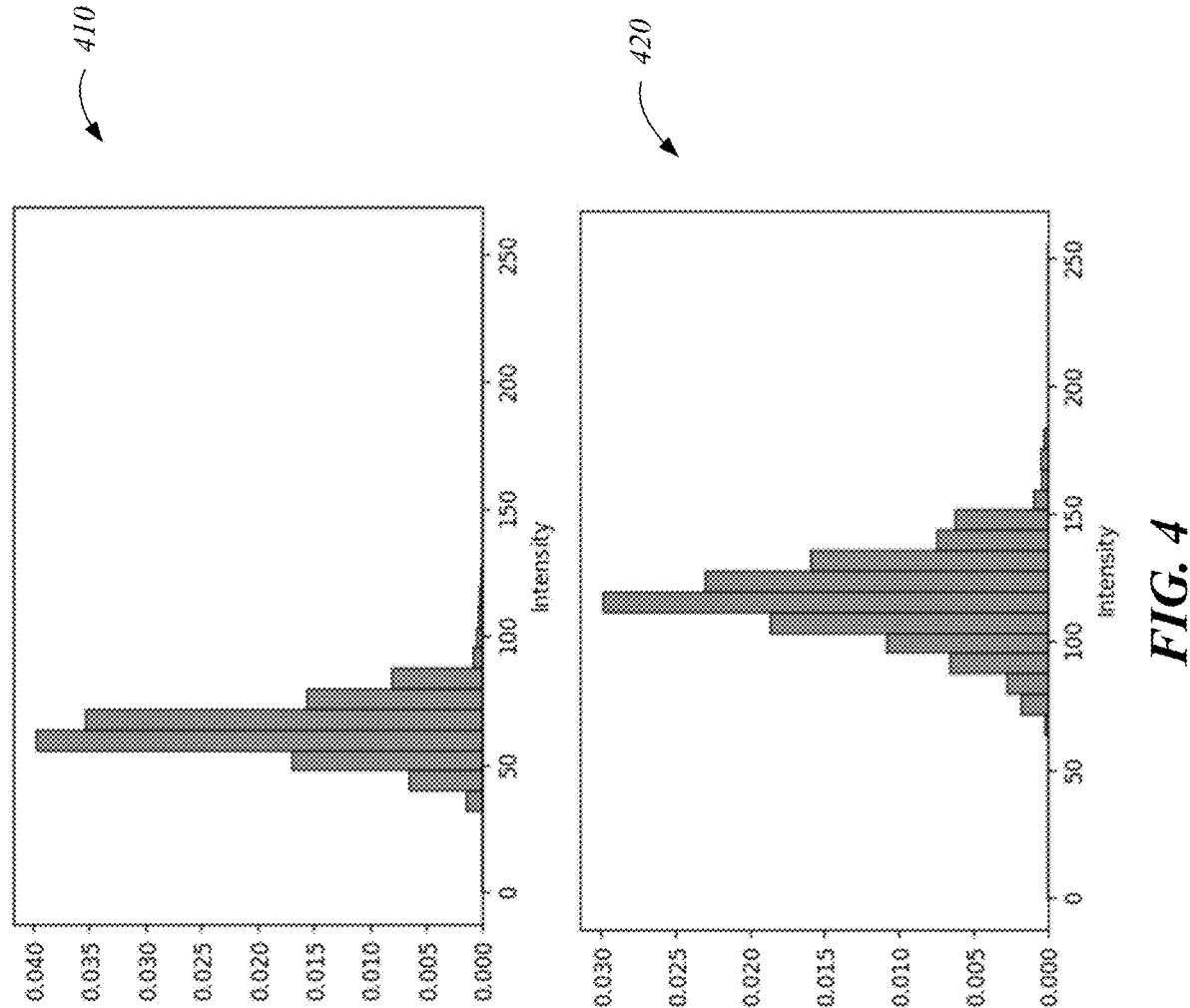
FIG. 4 graphically depicts a first histogram of an incoming video frame and a corresponding second, adjusted histogram that may be determined in order to apply appropriate pixel value adjustments to the frame to improve lighting and contrast, according to one example.

FIG. 4 graphically depicts a first histogram 410 of an incoming video frame and a corresponding second, adjusted histogram 420 that may be determined in order to apply appropriate pixel value adjustments to the frame to improve lighting and contrast, according to one example. In some embodiments, the histograms 410 and 420 may be with respect to only the face or skin pixels of the incoming frame, rather than the entire frame. As will be known by a person of ordinary skill in the art, a histogram is a common form in which to graphically represent light distribution in an image, such as a digital photograph or video frame. Generally, a histogram takes the form of a graph that depicts the brightness of an image by representing the frequency of each tone as a value on a bar chart. For example, a luminosity histogram, measuring brightness, generally represents (via the height of lines) the amount of tones at each brightness level represented along the x-axis (e.g., with pure black represented on the far left side, and pure white represented on the far right side). In addition to luminosity histograms (such as those shown in FIG. 4), a color histogram may also be produced for an image (e.g., measuring the intensity of red, green and blue tones), which is not presented in FIG. 4. In the example histograms 410 and 420, the intensity values may refer to the V (Value) channel of a video frame represented in the HSV space.

Common histogram problems that may addressed by aspects of the present disclosure include the histogram being far to the left side of the graph (which may indicate that the face appears dark and shadows are likely being clipped), far to the right side (which may indicate overexposure or a "washed out" appearance to the face), or generally bunched in a tight range (which may indicate low contrast). In the example shown in FIG. 4, the face in the original frame represented by the first histogram 410 is under low-lighting conditions. Through applying processes described herein, the system has increased the brightness in the relit image, as evident by shift in the peak (toward the right or center) of the distribution in the second histogram 420, while also moderately improving the contrast as evident by the increase in spread of the distribution in the second histogram 420.

Figure 5:
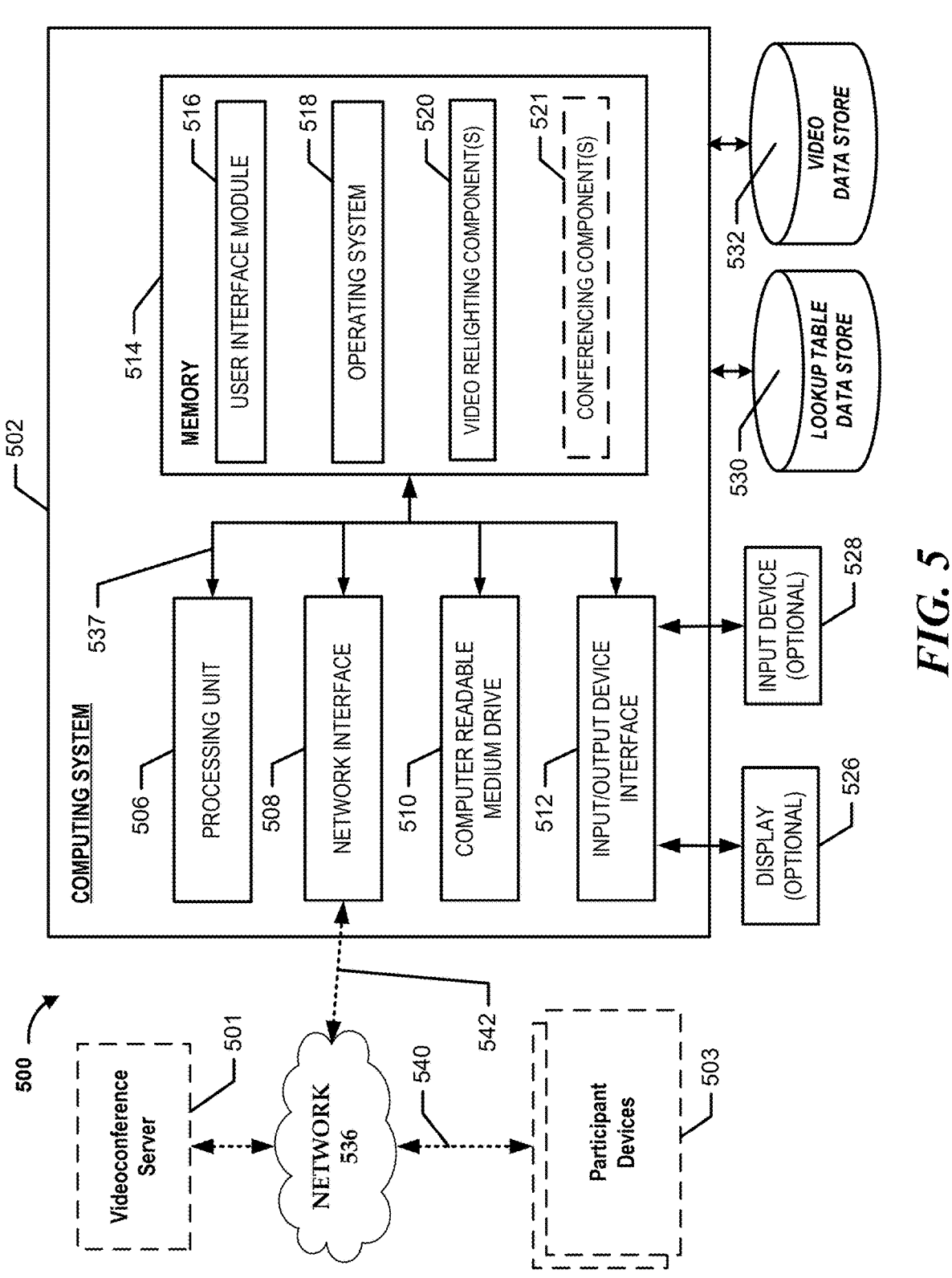
FIG. 5 is a block diagram depicting an illustrative architecture for a computing system that may implement one or more of the features described.

FIG. 5 illustrates a general architecture of a computing environment 500, according to some embodiments. As depicted in FIG. 5, the computing environment 500 may include a computing system 502. The general architecture of the computing system 502 may include an arrangement of computer hardware and software components used to implement aspects of the present disclosure. The computing system 502 may include many more (or fewer) elements than those shown in FIG. 5.

As illustrated, the computing system 502 includes a processing unit 506, a network interface 508, a computer readable medium drive 510, an input/output device interface 512, an optional display 526, and an optional input device 528, all of which may communicate with one another by way of a communication bus 537. The processing unit 506 may communicate to and from memory 514 and may provide output information for the optional display 526 via the input/output device interface 512. The input/output device interface 512 may also accept input from the optional input device 528, such as a keyboard, mouse, digital pen, microphone, touch screen, gesture recognition system, voice recognition system, or other input device known in the art.

The memory 514 may contain computer program instructions (grouped as modules or components in some embodiments) that the processing unit 506 may execute in order to implement one or more embodiments described herein. The memory 514 may generally include RAM, ROM and/or other persistent, auxiliary or non-transitory computer-readable media. The memory 514 may store an operating system 518 that provides computer program instructions for use by the processing unit 506 in the general administration and operation of the computing system 502. The memory 514 may further include computer program instructions and other information for implementing aspects of the present disclosure. For example, in one embodiment, the memory 514 may include a user interface module 516 that generates user interfaces (and/or instructions therefor) for display upon a computing system, e.g., via a navigation interface such as a browser or application installed on a user device 503.

In some embodiments, the memory 514 may include one or more video relighting components 520, which may be executed by the processing unit 506 to perform operations according to various embodiments described herein, such as determining and applying pixel value transformations with respect to received video frames to improve lighting. The video relighting component(s) 520 may access the lookup table data store 530 and/or video data store 532 in order to retrieve respective data described above and/or store data. The data stores 530 and/or 532 may each be part of the computing system 502, remote from the computing system 502, and/or may be a network-based service. In embodiments in which the video relighting component(s) 520 are used in connection with video conferencing features or services, the memory 514 may further include conferencing component(s) 521, which may interact over a network 536 with a videoconference server 501 and/or participant devices 503.

In some embodiments, the network interface 508 may provide connectivity to one or more networks or computing systems, and the processing unit 506 may receive information and instructions from other computing systems or services via one or more networks. In the example illustrated in FIG. 5, the network interface 508 may be in communication with a videoconference server 501 and/or one or more participant user devices 503 via the network 536, such as the Internet. In particular, the computing system 502 may establish a communication link 542 with a network 536 (e.g., using known protocols) in order to send communications to the computing device 503 over the network 536. Similarly, the computing device 503 may send communications to the computing system 502 over the network 536 via a wired or wireless communication link 540. In some embodiments, the computing system 502 may additionally communicate via the network 536 with a video conference server 501, which may be used by the computing system 502 to indirectly interact with the participant devices 503 to conduct a live videoconference, in certain embodiments. As discussed above, in other embodiments the video relighting component(s) 520 may operate on a user computing device (as one example instance of computing system 502) outside of a videoconferencing context, in which case the computing system 502 may not be in communication with other systems or devices over a network when implementing video relighting features described herein.

Those skilled in the art will recognize that the computing system 502 and user device 503 may be any of a number of computing systems or devices including, but not limited to, a laptop, a personal computer, a personal digital assistant (PDA), a hybrid PDA/mobile phone, a mobile phone, a smartphone, a wearable computing device, a digital media player, a tablet computer, a gaming console or controller, a kiosk, an augmented reality device, another wireless device, a set-top or other television box, one or more servers, and the like. The participant devices 503 and videoconference server 501 may each include similar hardware to that illustrated as being included in computing system 502, such as a display, processing unit, network interface, memory, operating system, etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:

memory; and at least one computing device configured with computer-executable instructions that, when executed, cause the at least one computing device to:

obtain a first frame of video content, wherein the video content depicts at least a human face as captured by a camera, wherein the camera is part of the system or in local communication with the system;

determine a bounding region within the first frame that includes depiction of the human face, wherein the bounding region is determined at least in part by providing the first frame as input to a machine learning model trained to detect depiction of human faces within an input image;

apply segmentation to image data within the bounding region of the first frame to identify pixels depicting skin;

determine transformation parameters based on intensity values of the pixels depicting skin, wherein the transformation parameters represent at least adjusted pixel intensity values determined by the system to improve at least one of brightness or contrast of the pixels depicting skin, wherein the transformation parameters are determined with respect to at least one channel of a color space;

store a lookup table based on the transformation parameters, wherein the lookup table comprises, for each possible input pixel intensity value in the at least one channel of the color space, a corresponding adjusted pixel intensity value determined by the system to improve the at least one of brightness or contrast of the pixels depicting skin;

generate a relit first frame of the video content, wherein the relit first frame of the video content is generated at least in part by changing an intensity value, for the at least one channel, of each pixel in the first frame to a corresponding adjusted pixel intensity value identified in the lookup table;

obtain a second frame of the video content;

determine, based at least in part on a comparison of lighting in the second frame relative to the first frame, to reuse the lookup table as stored with respect to the first frame; and based on the determination to reuse the lookup table, generate a relit second frame of the video content, wherein the relit second frame of the video content is generated at least in part by changing an intensity value, for the at least one channel, of each pixel in the second frame to a corresponding adjusted pixel intensity value identified in the lookup table, wherein the relit second frame of the video content is generated without detecting the human face within the second frame and without applying segmentation to the image data of the second frame.

2. The system of claim 1, wherein the color space is represented as Hue, Saturation, Value (HSV), and wherein the at least one channel for which the adjusted pixel intensity values are determined comprises a Value channel.

3. The system of claim 1, wherein the computer-executable instructions, when executed, further cause the at least one computing device to:

subsequent to generating the relit second frame of the video content using the lookup table, obtain a third frame of the video content;

determine, based at least in part on a detected change in lighting between the third frame and at least one of the first frame or the second frame, to modify the lookup table;

determine new transformation parameters based on intensity values of pixels depicting skin within the third frame; and store a modified lookup table based at least in part on the new transformation parameters, wherein the modified lookup table comprises, for each possible input pixel intensity value in the at least one channel of the color space, a corresponding newly adjusted pixel intensity value determined to improve the at least one of brightness or contrast of the pixels depicting skin within the third frame.

4. The system of claim 3, wherein each of the newly adjusted pixel intensity values in the modified lookup table comprise a moving average that is based at least in part on a corresponding value in the lookup table.

5. A computer-implemented method comprising:

obtaining a first frame of video content, wherein the video content depicts at least a human face as captured by a camera;

applying segmentation to image data of the first frame to identify pixels depicting skin;

determining transformation parameters based at least in part on intensity values of the pixels depicting skin, wherein the transformation parameters represent at least adjusted pixel intensity values determined to improve at least one of brightness or contrast of the pixels depicting skin, wherein the transformation parameters are determined with respect to at least one channel of a color space;

based on the transformation parameters, storing intensity association data that associates each possible input pixel intensity value in the at least one channel of the color space with a corresponding adjusted pixel intensity value;

generating a modified first frame of the video content, wherein the modified first frame of the video content is generated at least in part by changing an intensity value, for the at least one channel, of each pixel in the first frame to a corresponding adjusted pixel intensity value identified in the stored intensity association data;

obtaining a second frame of the video content; and generating a modified second frame of the video content, wherein the modified second frame of the video content is generated at least in part by changing an intensity value, for the at least one channel, of each pixel in the second frame to a corresponding adjusted pixel intensity value identified in the stored intensity association data, wherein the modified second frame of the video content is generated without applying segmentation to the image data of the second frame.

6. The computer-implemented method of claim 5 further comprising, prior to applying the segmentation:

determining a bounding region within the first frame that includes depiction of the human face, wherein the bounding region is determined at least in part by providing the first frame as input to a machine learning model trained to detect depiction of human faces within an input image, wherein the segmentation to identify pixels depicting skin is performed with respect to image data within the bounding region.

7. The computer-implemented method of claim 5, wherein the color space is represented as Hue, Saturation, Value (HSV), and wherein the at least one channel for which the adjusted pixel intensity values are determined comprises a Value channel.

8. The computer-implemented method of claim 5 further comprising:

subsequent to generating the second frame of the video content, obtaining a third frame of the video content;

determining, based at least in part on a detected change in lighting between the third frame and at least one of the first frame or the second frame, to modify the stored intensity association data;

determining new transformation parameters based on intensity values of pixels depicting skin within the third frame; and storing modified intensity association data based at least in part on the new transformation parameters, wherein the modified intensity association data comprises, for each possible input pixel intensity value in the at least one channel of the color space, a corresponding newly adjusted pixel intensity value determined to improve the at least one of brightness or contrast of the pixels depicting skin within the third frame.

9. The computer-implemented method of claim 8, wherein each of the newly adjusted pixel intensity values in the modified intensity association data comprises a moving average that is based at least in part on a corresponding value in the stored intensity association data.

10. The computer-implemented method of claim 5, wherein the computer-implemented method is implemented by a mobile phone or personal computer as the video content is captured by the camera, wherein the camera is part of or in local communication with the mobile phone or personal computer.

11. The computer-implemented method of claim 10 further comprising causing the mobile phone or personal computer to send, over a network, the modified first frame and modified second frame to a videoconference service for presentation to one or more devices participating in a videoconferencing instance.

12. The computer-implemented method of claim 5, wherein the transformation parameters are determined based at least in part on mean and standard deviation of the intensity values of the pixels depicting skin and a target intensity distribution.

13. One or more non-transitory computer readable media including computer-executable instructions that, when executed by a computing system, cause the computing system to perform operations comprising:

obtaining a first frame of video content, wherein the video content depicts at least a human face as captured by a camera;

identifying, from among a plurality of pixels within the first frame, pixels depicting skin;

determining transformation parameters based at least in part on intensity values of the pixels depicting skin, wherein the transformation parameters are determined with respect to at least one channel of a color space;

based on the transformation parameters, storing intensity association data that associates each possible input pixel intensity value in the at least one channel of the color space with a corresponding adjusted pixel intensity value;

generating a modified first frame of the video content, wherein the modified first frame of the video content is generated at least in part by changing an intensity value, for the at least one channel, of each pixel in the first frame to a corresponding adjusted pixel intensity value identified in the stored intensity association data;

obtaining a second frame of the video content; and generating a modified second frame of the video content, wherein the modified second frame of the video content is generated at least in part by changing an intensity value, for the at least one channel, of each pixel in the second frame to a corresponding adjusted pixel intensity value identified in the stored intensity association data.

14. The one or more non-transitory computer readable media of claim 13, wherein the operations further comprise, prior to identifying the pixels depicting skin:

determining a bounding region within the first frame that includes depiction of the human face, wherein the bounding region is determined at least in part by providing the first frame as input to a machine learning model trained to detect depiction of human faces within an input image, wherein the pixels depicting skin are identified with respect to image data within the bounding region.

15. The one or more non-transitory computer readable media of claim 13, wherein the operations further comprise determining and storing adjusted intensity association data with reference to a newly obtained frame of the video content in response to a trigger event.

16. The one or more non-transitory computer readable media of claim 15, wherein the trigger event is based on one of (a) a lighting change detected within the newly obtained frame relative to a prior frame, or (b) a determination that an amount of time that has passed since a previous update to the stored intensity association data meets a threshold.

17. The one or more non-transitory computer readable media of claim 13, wherein the transformation parameters are determined based at least in part on distribution of the intensity values of the pixels depicting skin and a target intensity distribution.

18. The one or more non-transitory computer readable media of claim 13, wherein the adjusted pixel intensity values are determined to improve at least one of brightness, contrast, saturation, tint, color, or exposure of the pixels depicting skin.

\* \* \* \* \*